INVENTOR.
ERICH TRUMPP

United States Patent Office 3,090,267
Patented May 21, 1963

3,090,267
UNIVERSAL LATHE STRUCTURE
Erich Trumpp, Flein, Kreis Heilbronn, Germany, assignor to Eugen Weisser & Co. KG., Heilbronn, Germany
Filed July 21, 1960, Ser. No. 44,314
Claims priority application, Germany Sept. 23, 1959
10 Claims. (Cl. 82—5)

This invention relates to universal lathes of the lead screw and feed rod type, and particularly to lathes which can be operated for the automatic cutting of all kinds of high-precision threads without cutting down the working range between the centers, and using preferably carballoy and ceramic tools.

Thread cutting machines are known which are preferably designed as single-purpose machine tools. However, the cost of such a machine is very high, and in most cases their production capacity cannot be utilized to the fullest extent in small and medium size workshops. It is cumbersome to set conventional embodiments of this type of machine for another pitch or thread or for another threading length, because cams have to be exchanged. On top of this usually the maximum thread length to be cut is comparatively small.

Other machine tools exist, which are built similar to conventional lead screw and feed rod lathes, in which the carriage hits a limit switch at the end of each stroke when threads are to be cut, which limit switch causes the reversal of the direction of rotation of the main spindle drive. However, the production capacity of this type of machine is confined to close limits on account of the continuous reversal of the rotating masses. Furthermore, special compound rests are needed when threads have to be cut to a shoulder, whereby the cutting tool is retracted shortly before hitting the shoulder, in the opposite direction of the movement of the compound rest, and then again is moved forward into the starting position.

Furthermore thread cutting machines are available on the market, in which only the direction of rotation of the lead screw is reversed and in which the direction of rotation of the main spindle is kept constant. In these machines the reversing gear is arranged after the change gears immediately before the lead screw. This arrangement has the disadvantage that only those threads can be cut with a lead screw the pitch of which is contained as an integer in the lead screw pitch. Thus, in this case various lead screws must be kept in stock.

Other additional devices for cutting threads are known which can be mounted on standard lathes. In these devices the movement of the tool is controlled by cams, for which reason they can be used for cutting short threads only. It is cumbersome and time consuming to mount these devices on the lathe and to dismount them, when not needed. On top of this the operating range of the machines is diminished.

According to the present invention, a lead screw and feed rod lathe is built in such a way that automatic thread cutting using preferably carballoy and ceramic tools becomes possible without impairing the range of turning operations of the lathe. The invention consists in such novel features, constructions, arrangements and combinations and improvements of parts as may be shown and described in connection with the apparatus herein disclosed by way of example only and as illustrative of a preferred embodiment.

Objects and advantages of the invention will be set forth in part hereafter and in part will be obvious herefrom or may be learned by practicing the invention, the same being realized and attained by means of the instrumentalities and combinations pointed out in the appended claims.

It is an object of this invention to provide means for utilizing the entire turning range of the machine tool for cutting threads.

Another object of the invention is to provide means affording efficient thread cutting operations and wherein the mass of the workpiece has no influence on the thread cutting operations.

Furthermore, it is an object of the invention to provide means affording a quick change of the pitch of the threading, on the change-gear box.

Yet another object of the invention is to provide means contributing to the production of metric, inch, modulus and diametral pitch threads using only one lead screw.

A further object of this invention is to provide means affording a changeover from thread cutting to ordinary turning within a minimum of downtime so that the machine tool may be used economically in a truly universal way. In other words, with one setting it should be possible to perform the operations of conventional turning, copy-machining and automatic threading.

Another object of the invention is to provide means resulting in simple and fast setting up of the machine tool for cutting threads such that even a single threaded workpiece may be produced economically.

It is also an object of the invention to provide means facilitating the production of conical threads by using mechanical or hydraulic copy-machining devices, whereby the operating range of the copy-machining device is not impaired by the thread cutting apparatus.

Various further and more specific purposes, features and advantages will clearly appear from the detailed description given below taken in connection with the accompanying drawings which form part of this specification and illustrate merely by way of example one embodiment of the device of the invention.

In the following description and in the claims, parts will be identified by specific names for convenience, but such names are intended to be as generic in their application to similar parts as the art will permit. Like reference characters denote like parts in the several figures of the drawings.

FIG. 1a is a plan view of the carriage of the lathe, partly cut away and showing parts in section;

FIG. 2 is a detail sectional view taken along line II—II in FIG. 1a; and

Figure 1:
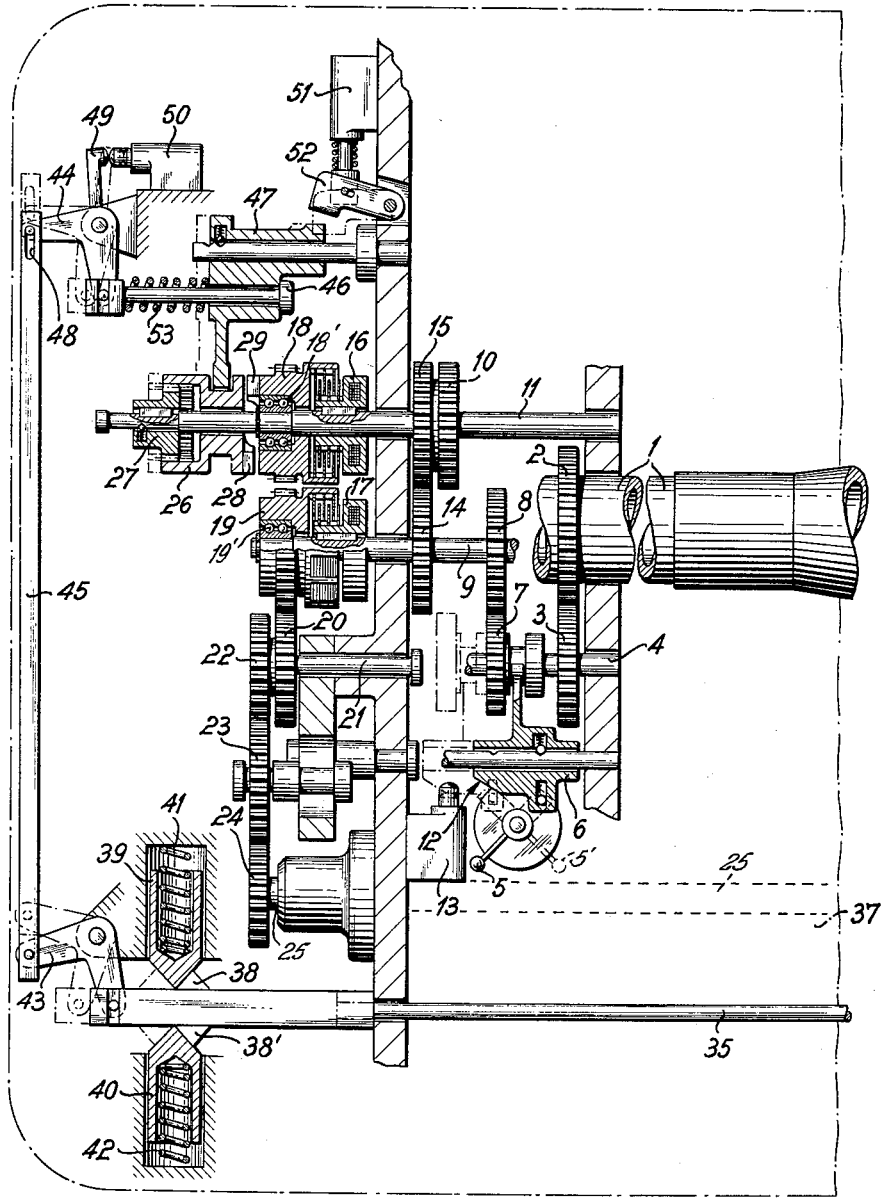
FIG. 1 is a diagrammatic single plane view of the drive elements in the head stock of the lathe, with parts being shown in section.
Figure 2:
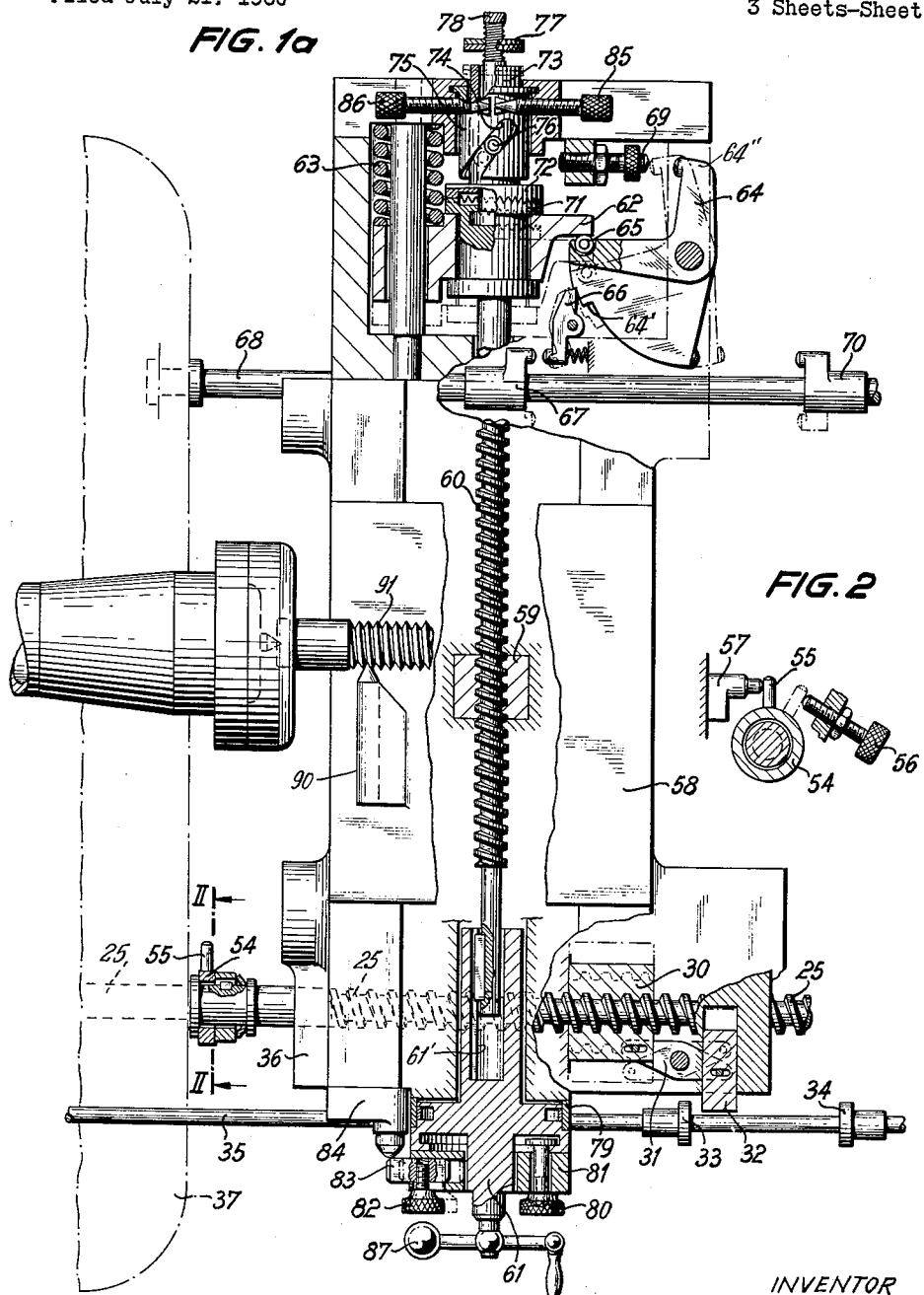

In FIGS. 1 and 2, the gearing is illustrated as if all the center lines of rotation thereof were in a single plane, even though, in an actual machine, the several rotational center lines of the gearing may be in as many different planes.

Figure 3:
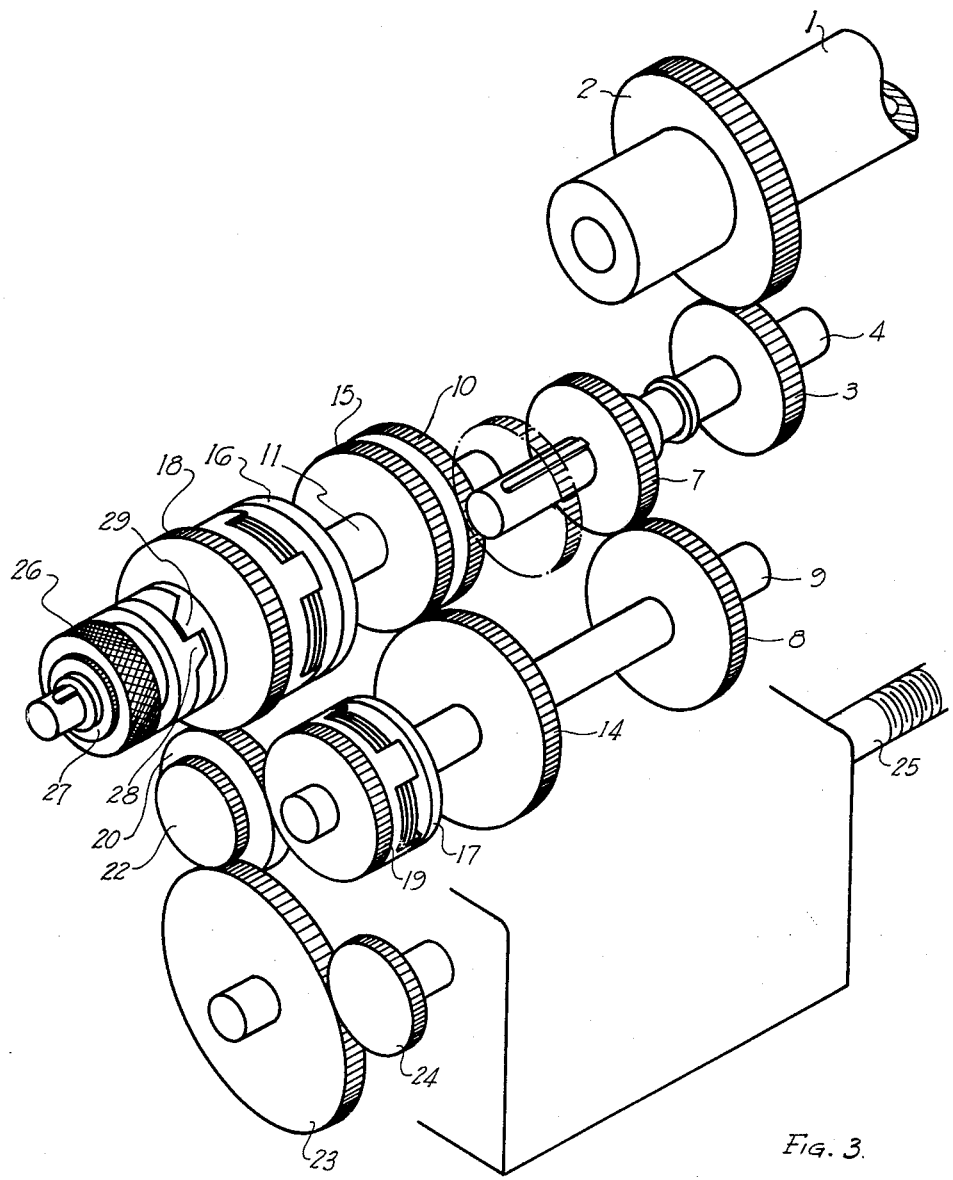
FIG. 3 is a perspective view of the lathe gearing.

Referring now in more detail to the drawings illustrating a preferred embodiment by which the invention may be realized, there is a main spindle 1 in the headstock 37 of a lathe, and which drives an intermediate shaft 4 by means of spur gears 2 and 3. Keyed to the shaft 4 is a spur gear 7 which can be shifted by a fork 6 operated by a lever 5. The spur gear 7 is in mesh with a spur gear 8 located on the reversing shaft 9, when lever 5 is in the "right-hand thread" position, while it is in mesh with a spur gear 10 arranged on the forward rotating shaft 11 when said lever 5 is switched to the "left-hand thread" position, as marked 5'. This latter position of gear 7 is shown in broken lines in FIG. 3.

The fork 6 has a bevelled face 12, which operates a limit switch 13 when lever 5 is switched over to the position 5'. Hereby the main spindle drive (not shown in the drawing) is reversed. Thus the direction of rotation of the reversing shaft 9 and the forward rotating shaft 11, which are geared together by the spur gears 14 and 15, is kept unchanged. A multiple disk electrically operated clutch 16, rotatable with the shaft 11, is arranged, when energized, to couple a spur gear 18 to the shaft 11, spur gear 18 normally free wheeling on ball bearings 18'. Similarly, a multiple disk electrically energized clutch 17 is fixed to rotate with shaft 9 and is arranged, when energized, to couple a spur gear 19 to rotate with the shaft 9, spur gear 19 normally free wheeling on ball bearings 19'. Spur gears 18 and 19 mesh with a spur gear 20 rotatable on a stub shaft 21.

The lead screw 25 is driven by the change gears 22, 23, 24 and by the thread cutting gear (not shown in the drawing), gear 22 being fixed to rotate with spur gear 20. A single-tooth coupling 26 is arranged on the forward rotating shaft 11 in order to guarantee that the cutting tool always engages the start of the threading after every pass. The single-tooth coupling 26 is coupled with the indexing gear 27 and transmits the torque through the abutment or tooth 28 to the counter-abutment or tooth 29 which forms part of the gear part 18 (see FIG. 3).

The operation of the clutches 16 and 17 is effectuated by the movement of the carriage 36. When the locking nut 30 is closed, the operating bar 32 is moved, by means of the double-arm lever 31, into the range of movement of the collars 33 and 34 which are adjustably located on the shift bar 35. The distance between said collars 33 and 34 is set according to the length of the thread to be cut. At the start of the thread cutting operation the shaft bar 35 is in the position as shown in solid lines in FIG. 1. The single-tooth coupling 26 is engaged while the clutches 16 and 17 are de-energized. By the forward rotation of the lead screw 25, the carriage 36 is moved toward the headstock 37, until the operating bar 32 hits the collar 33 and moves the shift bar 35 to the left as viewed in FIGS. 1 and 2.

The shift bar 35 has two cams 38 and 38', which have faces inclined at 45° by which two pointed plugs 39 and 40, yieldably held in contact with said faces of said cams 38 and 38' by springs 41 and 42, are cocked. When the shift bar 35 continues moving cams 38, 38' over the points of the plugs 39 and 40, it is rapidly pushed, by the forces of the compressed springs 41 and 42, into the position shown in dash-dotted lines in FIG. 1, whereby the single-tooth coupling 26 is disengaged via the bell crank levers 43 and 44, the connecting rod 45, the push rod 46 and the shifting fork 47. In the connecting rod 45 there is an elongated hole 48 near the bellcrank lever 44, whereby that part of the movement is taken up which corresponds to the cocking of the plugs 39 and 40. Thus the bellcrank lever 44 is operated only by the accumulated force of the compressed springs 41 and 42.

A lever 49 is connected with the bell crank lever 44, and operates a limit switch 50 to energize the clutch 17, which causes the reversal of the rotation of the lead screw 25. At the same time the solenoid 51 is de-energized, whereby the return movement of the switch fork 47 is blocked by the lever 52.

It may be well to note, at this point, that gears 18 and 19 are continuously meshed with gear 20 and are free wheeling on their respective shafts 11 and 9 except when their respective clutches 16 and 17 are energized. It should further be noted that these gears 18 and 19 are effective to rotate the gear 20 in opposed directions.

As soon as the direction of rotation of the lead screw 25 is reversed, a ring 54 which is rotatably held by friction on the lead screw 25 and which carries a pin 55 of abutting set screw 56 when the lead screw rotates in the opposite direction, is moved to engaged pin 55 with a switch 57 whereby the solenoid 51 is energized, thus lifting the blocking lever 52. Hereby the switch fork 47 is released and the force of the spring 53 causes it to engage the single-tooth coupling 26. Simultaneously the switch 57 de-energizes the forward clutch 16. The abutment 28 engages the counter-abutment 29 of the spur gear part 18 and takes over the driving of the carriage 36. Herewith the cycle of operation starts again, as described.

*Forward and Retracting Movement of the Cutting Tool*

The compound rest 58 which carries the cutting tool 90 can be adjusted by means of the nut 59 engaging the spindle 60, when said spindle 60 is rotated and also when it is axially displaced. To this end, the front end of the spindle 60 is slidably guided in telescopic fashion in the bore 61' of a crank member 61, whereas the rear end of said spindle 60 is axially guided by the sliding member 62. A spring 63 forces the sliding member 62 against a roller 65 which is rotatably mounted in the trigger lever 64, said trigger lever 64 having a ratchet tooth 64' which is engaged by a pawl 66.

When the carriage 36 is moved toward the headstock 37, the pawl 66 hits a collar 67, which is adjustably located on the shaft 68 which is rotatably arranged in the headstock 37 and in the frame of the lathe (this end not shown in the drawing). Hereby the trigger lever 64 is released. The compound rest 58 is moved instantaneously by the force of the compressed spring 63 until the bell crank lever arm 64" of the trigger lever 64 abuts against the adjustable stop screw 69. Thus the cutting tool 90 is instantaneously withdrawn from the workpiece 91. When the carriage 36 returns to its starting position, the trigger lever 64 is rotated by abutting against the adjustable collar 70 which also is located on the shaft 68, whereby the compound rest 58 is displaced so that the tool 90 again is positioned against the workpiece 91, by the engagement of the sliding member 62 with the roller 65 on said trigger lever 64. The pawl engages the ratchet tooth 64' whereby this cycle of operation starts again.

*Cutting Depth Feed Adjustment*

The feed adjustment of the cutting depth is taken from the axial movement of the carriage spindle 60. To this end the carriage spindle 60 has a face gear 71 cut into its rear end, said face gear engaging the counterpart face gear 72 of the feed bushing 73 during the feed motion of the tool 90. The feed bushing 73 is rotatably held and axially displaceable in a bushing 75 which has a helical cam groove 74.

A cam follower roller 76 engaging cam groove 74 is rotatably mounted on the feed bushing 73 and imparts upon the bushing 73 a rotary motion when the latter is axially displaced, which rotary motion is transferred by way of the face gearing 71, 72 to the carriage spindle 60 and thus feeds the tool 90 forward by the new depth of the cut. When the tool is moved back, first the face gearing 71, 72 is disengaged, then the feed bushing 73 is pulled by means of the nuts 77 of the pull rod 78 into the starting position, said pull rod 78 being an extension of the spindle 60. The cutting feed can be adjusted in increments of one pitch of the face gears 71, 72 by means of the adjustment of the stroke of the feed bushing 73. This adjustment can be made by setting the nuts 77.

The crank member 61 has, in front of the dial ring 79, a rotatable ring 81 which can be clamped to the crank member 61 by the nut 80. The ring 81 carries a cam 83, which can be radially adjusted beyond the outside diameter of said ring 81 and which can be clamped to the crank member 61 by a screw 82. The ring 81 is set in such way that the cam 83 hits the switch 84 at the last cutting depth feed movement whereby the machine is switched off in its starting position.

Since the smallest increment of the cutting depth feed movement depends upon the pitch of the face gear 71, a micro-adjustment for the accurate root diameter of the thread to be cut is made possible by a small rotation of the bushing 75 by means of the set screws 85, 86. The face gears 71, 72 are disengaged when the tool 90 is moved back and the cutting depth feed can be corrected by hand by adjusting the carriage crank handle 87. It also is possible to completely switch off the automatic cutting depth feed, which is an advantage when single threads are being produced.

The following is a summary of the operation of the apparatus during one cycle. In the position shown in the drawing, the tool slide 36 is moving in a direction toward the head stock 37, or toward the left. The main spindle 1, as viewed in a direction looking from the head stock toward the tail stock, rotates clockwise and, with gear 7 in engagement with gear 8, shaft 11 rotates counterclockwise so that the part 26 of the one-tooth coupling will also rotate counterclockwise. This part is slidable on the shaft 11 but non-rotatable thereon.

As tooth 28 bears against tooth 29, gear 18 is rotated counterclockwise and gear 20, which meshes with gear 18, is rotated clockwise as is also the gear 24 on the spindle 25. The pitch of spindle 25 is so chosen that, when the latter is rotated clockwise, it draws slide 36 toward the head stock.

As illustrated, the member 32 is adjacent the abutment 33 secured on the rod 35. Thus, the tool is almost at its left limit of movement. As the slide reaches the left limit of movement, along with the tool, member 32 engages abutment 33 and moves rod 35 to the left. In the manner already described, this disengages the one-tooth coupling by moving the axially slidable coupling part to the left to disengage the teeth 28 and 29. Spindle 25 is thereupon no longer driven by the one-tooth coupling.

At the same time, lever 49 actuates switch 50 which energizes the clutch 17 so that the gear 19 is effectively coupled to the shaft 9. However, shaft 9 is rotating in a direction opposite to the direction of rotation of shaft 11. Consequently, gear 24 is now turned counterclockwise as is also spindle 25, and the slide 36 is moved toward the right in the direction of the tail stock. This movement continues until abutment 32 strikes abutment 34, which moves control rod 35 to the right.

When control rod 35 is moved back toward the right, connecting rod 45 is moved downwardly, as viewed in FIG. 1, and rocks the lever 44 counterclockwise. However, the shifting fork 47 is not moved because it is prevented from moving by the latch 52, and the only effect of the swinging movement of the crank 44 is to compress the spring 53. Latch 52 remains in this position because magnet 51 is de-energized.

While the invention has been described and illustrated with respect to a certain particular preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

Having thus described the invention, what is claimed as new and desired to be secured by Letters Patent is:

The energizing circuit for magnet 51 includes the switch 57 of FIG. 2, which is actuated by the pin 55 projecting from the ring 54 which has a friction fit on the spindle 25. When spindle 25 is rotated clockwise, for feed and for cutting thread, then pin 55 is in the dotted line position shown in FIG. 2 and the switch 57 is not operated. However, when spindle 25 is rotated counterclockwise, ring 54 is taken along by friction and pin 55 will strike the operator of switch 57 so as to operate this switch. Switch 57 is normally biased to a position opening the circuit of clutch 16 and closing the circuit of solenoid 51, so that when pin 55 strikes its operator, the switch 57 is operated to a position opening the circuit of solenoid 51 and closing that of clutch 16. Thus, switch 57 remains in the latter position during counterclockwise rotation of spindle 25 moving the slide 36 to the right. Consequently, as long as pin 55 is in the full line position of FIG. 2, magnet 51 remains de-energized.

The switch 50, operated by the extension 49 of the crank 44, energizes clutch 17 and de-energizes clutch 16 when its operator is depressed by the arm 49. When its operator is disengaged by the arm 49, as in the full line position of FIG. 1, the switch 50 de-energizes the clutch 17 and closes a part of the energizing circuit for clutch 16. However, the energizing circuit of clutch 16 also includes the switch 57 and is closed when switch 57 is in the full line position, with relation to pin 55, as shown in FIG. 2. Consequently, clutch 16 is engaged for only such a time as is necessary to reverse the movement of the spindle 25. Thereafter, pin 55 moves into the broken line position of FIG. 2, and switch 57 breaks the energizing circuit of clutch 16. However, and as stated, this operation of switch 57, when it is disengaged by the pin 55, closes the energizing circuit of solenoid 51 so that the latter lifts the latch 52 from its broken line position into the full line position. Thus, the shifting fork 47 is released and, under the influence of spring 53, moves the part 26 of the one-tooth coupling of the right. The parts are now again in the starting position, with the clutches 16 and 17 being disengaged and the one-tooth coupling 26 engaged. Spindle 25 is now rotated clockwise, by virtue of rotation of gear 20 by gear 18, and the slide 36 is drawn toward the head stock.

An important feature of the invention is that, at the time the teeth 28 and 29 engage each other, both the gear 18 and the part 26 are rotating in the same direction although at different speeds. Due to the temporary energization and engagement of the clutch 16, the gear 18 is rotated in the same direction as the direction of rotation of the shaft 11. As the clutch 16 is again de-energized, the gear 18 begins to decelerate but nevertheless it is still rotating in the same direction as is the part 26 of the one-tooth coupling. The gear 18, when driven by the part 26 through engagement of teeth 28 and 29, is freely rotatable on shaft 11 and the deceleration thereof continues until teeth 28 and 29 do engage. As the two teeth 28 and 29, which are rotating in the same direction but at different speeds, come into engagement, gear 18 is again rotated with the shaft 11. It should be further noted that, in cutting a right hand thread the spindle 1 is always rotated in one particular direction. However, in cutting a left hand thread, the direction of rotation of the spindle 1 is reversed but, during the cutting of the left hand thread, the spindle 1 is always rotated in such reverse direction. Consequently, for a thread of a particular hand, the spindle 1 continually rotates in the same direction during the entire thread cutting operation.

What is claimed is:

1. A universal lathe and thread cutting machine comprising, in combination, a head stock; a carriage movable toward and away from said head stock; a main spindle continuously rotated in a single respective direction during cutting of threads of one respective hand, and continuously rotated in the opposed direction during cutting of threads of the other respective hand; a rotatable lead screw threadedly connected to said carriage for moving the latter in reverse directions relative to said head stock; first and second substantially parallel rotatable shafts geared together for rotation in opposed directions; gearing operable to drive one of said shafts from said spindle; a first gear freely rotatable on said first shaft; a second gear freely rotatable on said second shaft; gearing, including a third gear meshing with both said first and second gears, drivingly interconnecting said lead screw to said first and second gears; a first clutch rotatable with said first shaft, and operable, when energized, to couple said first gear to said first shaft for rotation therewith; a second gear rotatable with said second shaft, and operable, when engaged, to couple said second gear to said second shaft for rotation thereof; said clutches being normally disengaged; a single tooth coupling, including a drive element rotatable with and axially movable on said first shaft, and a driven element rotatable with said first gear, said coupling being engaged during rotation of said lead screw in a forward direction to move said carriage toward said head stock; first means operable, responsive to said carriage reaching substantially its limit of movement toward said head stock, to disengage said coupling and engage said second clutch for reverse rotation of said lead screw; second means, including said first means, operable, responsive to said carriage reaching substantially its limit of movement away from said head stock, to disengage said second clutch and momentarily to engage said first clutch to initiate forward rotation of said lead screw; and third means operable, responsive to such initiation of forward movement of said lead screw, to disengage said first clutch and to re-engage said coupling, while the elements of the latter are rotating in the same direction with said driven element decelerating due to disengagement of said first clutch.

2. A universal lathe and thread cutting machine, as claimed in claim 1, in which said first and second clutches are electrically operated; said first means including a shift lever connected to said coupling, an operator for said shift lever, and a switch actuated by said operator and having two positions, in one of which it closes an energizing circuit for said second clutch and in the other of which it closes a portion of an energizing circuit for said first clutch; said third means including a two position switch operable, in one position, to complete the energizing circuit for said first clutch and a switch operator rotated, upon the start of reverse rotation of said lead screw, to a position operating said second switch to its first position and rotated by said lead screw, upon such initiation of forward movement of the latter, to a position operating said second switch to its second position opening the energizing circuit of said first clutch.

3. A universal lathe and thread cutting machine, as claimed in claim 2, in which the operator for said second switch comprises a collar frictionally embracing said lead screw and having a pin engageable with said switch; and means limiting the movement of said collar during rotation of said lead screw in such forward direction.

4. A universal lathe and thread cutting machine, as claimed in claim 2, including a lost motion spring biased connection between said shift lever and the operator therefor whereby said first switch may be operated by said operator with said shift lever remaining in a position in which said coupling is disengaged; a latch moved into a latching position, obstructing movement of said shift lever to the coupling engaging position, responsive to initiation of reverse rotation of said lead screw; and a solenoid effective to operate said latch to the release position; said solenoid being energized in the second position of said second switch.

5. A universal lathe and thread cutting machine, as claimed in claim 3, in which said means limiting movement of the operator of said second switch comprises an adjustable set screw.

6. A universal lathe and thread cutting machine, as claimed in claim 1, in which said first and second means include a rod extending parallel to said lead screw and movable lengthwise thereof; a pair of collars secured in adjustably fixed longitudinally spaced relation on said rod; an abutment carried by said carriage and selectively engageable with said collars at either limit of movement of said carriage; said clutches being electrically energized; a shift lever for said coupling; a crank for operating said shift lever; switch means operable by said crank and included in the energizing circuits of said clutches; and linkage interconnecting said rod and said crank for operation of said crank at opposite limits of movement of said carriage.

7. A universal lathe and thread cutting machine, as claimed in claim 1, including a compound rest on said carriage; a thread cutting tool carried by said compound rest; a trigger lever on said compound rest; means operable, responsive to movement of said carriage relative to said head stock, to operate said trigger lever; and a stepless adjustable stop screw limiting the amplitude of movement of said trigger lever.

8. A universal lathe and thread cutting machine, as claimed in claim 7, including a spindle on said compound rest; a rotatable and axially displaceable feed bushing on said spindle; a face gear carried by said feed bushing; a cam follower extending radially from the periphery of said feed bushing; a stationary bushing circumferentially embracing said feed bushing; said stationary bushing having a helical cam groove engaged by said cam follower; and means operable responsive to withdrawing movement of said spindle and said compound rest to reset said feed bushing into its starting position.

9. A universal lathe and thread cutting machine, as claimed in claim 8, including threadedly adjustable setting means on said spindle for adjusting the axial stroke of said feed bushing.

10. A universal lathe and thread cutting machine, as claimed in claim 9, including micro-adjustment set screw means operable on said stationary bushing to adjust the same angularly to correct the stroke of said feed bushing.

No references cited.